(12) United States Patent
Kim (10) Patent No.: US 10,121,624 B2
(45) Date of Patent: Nov. 6, 2018

(54) POSITION INDICATOR OF AIR CIRCUIT BREAKER

(71) Applicant: LSIS CO., LTD., Anyang-si, Gyeonggi-do (KR)

(72) Inventor: Kyujung Kim, Anyang-si (KR)

(73) Assignee: LSIS CO., LTD., Anyang-Si, Gyeonggi-Do (KR)

( * ) Notice: Subject to any disclaimer, the term of this patent is extended or adjusted under 35 U.S.C. 154(b) by 8 days.

(21) Appl. No.: 15/643,336

(22) Filed: Jul. 6, 2017

(65) Prior Publication Data

US 2018/0182586 A1   Jun. 28, 2018

(30) Foreign Application Priority Data

Dec. 27, 2016 (KR) .......................... 10-2016-0180462

(51) Int. Cl.
*H01H 9/20* (2006.01)
*H01H 71/04* (2006.01)
*H02B 11/10* (2006.01)
*H01H 9/22* (2006.01)
*H02B 11/127* (2006.01)

(52) U.S. Cl.
CPC .............. *H01H 71/04* (2013.01); *H02B 11/10* (2013.01); *H01H 9/22* (2013.01); *H02B 11/127* (2013.01)

(58) Field of Classification Search
CPC .......... H01H 9/22; H01H 9/226; H01H 71/04; H01H 11/10; H01H 11/127; H01H 3/30; H01H 3/20; H01H 9/20; H01H 33/6661; H01H 21/06; E05C 19/003; E05C 19/10; E05C 21/00; H02B 11/26; H02B 11/173

USPC ......... 200/50.24, 50.21, 50.26, 50.01, 50.17, 200/50.12, 401, 50.13, 327, 50.02, 50.03, 200/50.23, 50.25, 50.3

See application file for complete search history.

(56) References Cited

U.S. PATENT DOCUMENTS

| | | | |
|---|---|---|---|
| 6,777,627 B1 * | 8/2004 | Stevenson | H02B 3/00 200/50.21 |
| 6,951,990 B1 * | 10/2005 | Miller | H02B 11/127 200/50.21 |

(Continued)

FOREIGN PATENT DOCUMENTS

| | | |
|---|---|---|
| CN | 101172548 | 5/2008 |
| CN | 102280275 | 12/2011 |

(Continued)

OTHER PUBLICATIONS

Korean Office Action for related Korean Application No. 10-2016-0180462; action dated Jan. 19, 2018; (5 pages).

(Continued)

*Primary Examiner* — Ahmed Saeed
(74) *Attorney, Agent, or Firm* — K&L Gates LLP (57) ABSTRACT

In the present disclosure, a link part is connected to a worm wheel rotated according to rotation of a worm gear and a movement member is connected to the link part, whereby a rotational motion of the worm wheel is changed to a translational motion in a horizontal direction through the link part and the movement member. Thus, although an indicator is positioned on an upper side of a handle insertion part, a position according to movement of a circuit breaker body may be easily indicated, while using a simple structure.

8 Claims, 13 Drawing Sheets

(56) References Cited

U.S. PATENT DOCUMENTS

| | | | |
|---|---|---|---|
| 7,057,123 B1* | 6/2006 | Jenkins | H02B 11/133 200/50.23 |
| 2005/0161307 A1 | 7/2005 | Deylitz | |
| 2011/0147173 A1* | 6/2011 | Lee | H02B 11/127 200/50.25 |
| 2012/0085628 A1* | 4/2012 | Pearce | H01H 9/22 200/50.24 |
| 2012/0199450 A1* | 8/2012 | Bower | H02B 11/127 200/50.25 |

FOREIGN PATENT DOCUMENTS

| | | |
|---|---|---|
| EP | 0536573 | 4/1993 |
| EP | 0901142 | 3/1999 |
| EP | 1353425 | 10/2003 |
| EP | 1916691 | 4/2008 |
| EP | 1968090 A1 | 9/2008 |
| EP | 2387054 | 11/2011 |
| KR | 19900001886 | 4/1989 |
| KR | 20000013900 A | 3/2000 |
| KR | 0346443 | 7/2002 |
| KR | 0480860 | 3/2005 |
| KR | 20060055413 A | 5/2006 |
| KR | 20090019541 A | 2/2009 |
| KR | 2020130003512 U | 6/2013 |

OTHER PUBLICATIONS

European Search Report for related European Application No. 17177354.2; report dated Jan. 12, 2018; (8 pages).
Korean Intellectual Property Office Search report dated Sep. 21, 2016, 3 pages.

* cited by examiner

POSITION INDICATOR OF AIR CIRCUIT BREAKER

CROSS-REFERENCE TO RELATED APPLICATION

Pursuant to 35 U.S.C. § 119(a), this application claims the benefit of earlier filing date and right of priority to Korean Application No. 10-2016-0180462, filed on Dec. 27, 2016, the contents of which are all hereby incorporated by reference herein in its entirety.

BACKGROUND OF THE DISCLOSURE

1. Field of the Disclosure

The present disclosure relates to a position indicator of an air circuit breaker, and particularly, to a position indicator of an air circuit breaker capable of enabling an indicator to be positioned above a handle insertion unit by converting a rotational motion into a linear motion.

2. Background of the Disclosure

In general, a circuit breaker is a device for breaking a circuit to protect a load and a power source when an abnormal current or a fault current occurs in an electric circuit. An air circuit breaker is a kind of circuit breaker for breaking a current when a load is opened or closed or an accident such as grounding or a short-circuit occurs in an electric circuit, or the like, or in transmission and transformation of electric power. The air circuit breaker is mainly used in a low pressure device.

A circuit breaker may have a cradle for checking, using, or replacing a circuit breaker body. Here, circuit breakers include a fixed type circuit breaker in which a circuit breaker body is fixed to a cradle and a drawable type circuit breaker in which a circuit breaker body is drawn in to a cradle or drawn out from the cradle.

Among them, in the drawable type circuit breaker, a circuit breaker body is drawn in to a cradle for conduction of a current, and in the draw-in state, the circuit breaker performs closing (ON) and trip (OFF) operations. When the circuit breaker is ON and an accident current occurs in a line, the circuit breaker interrupts the accident current after the lapse of a predetermined time or immediately depending on a magnitude of the accident current.

Figure 1:
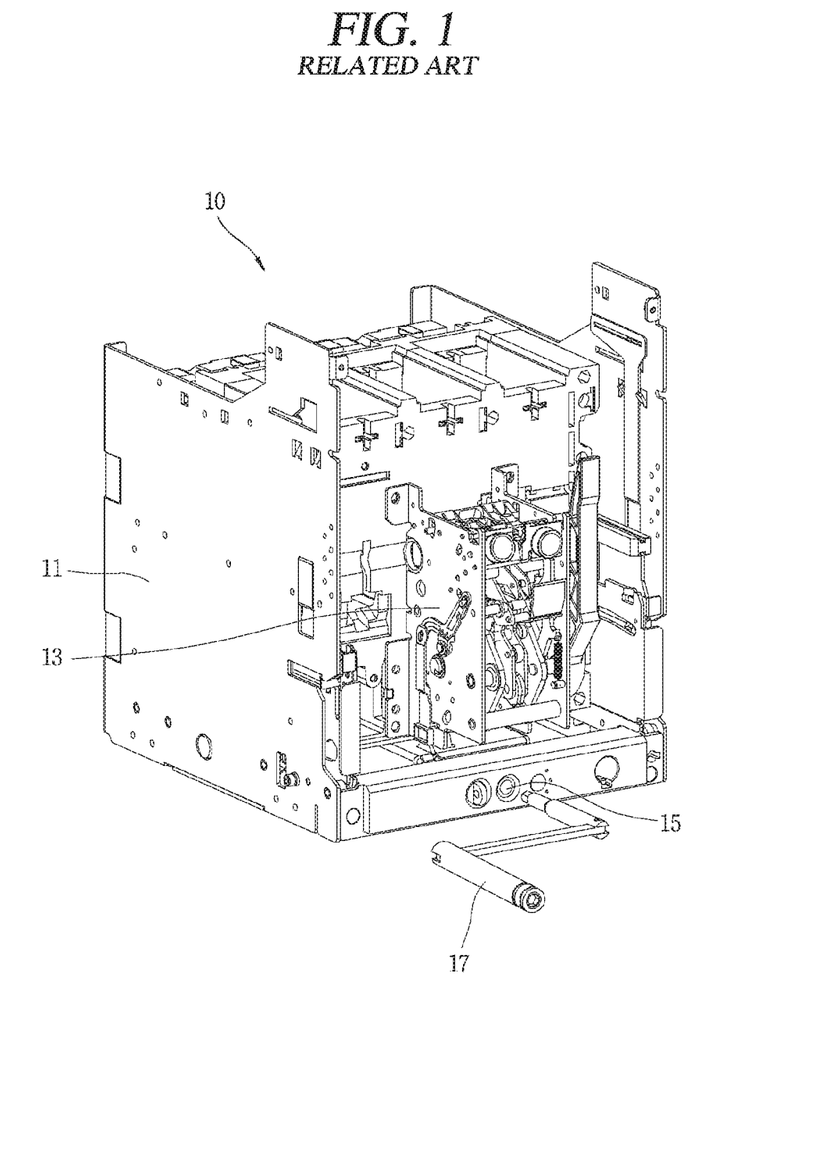
FIG. 1 is a configuration view illustrating a conventional air circuit breaker.

FIG. 1 is a configuration view illustrating a conventional air circuit breaker.

As illustrated in FIG. 1, the conventional air circuit breaker 10 includes a circuit breaker body 13, a cradle 11 in which the circuit breaker body 13 is positioned and moved, a handle insertion part 15 into which a handle 17 is inserted, and the handle 17 inserted into and rotated in the handle insertion part 15 to move the circuit breaker body 13 to a drawn-out position (DISCONNECT), a test position (TEST), and a drawn-in position (CONNECT).

Thus, when the circuit breaker body 13 is positioned within the cradle 11 and the handle 17 is inserted into the handle insertion part 15 and rotated therein, the circuit breaker body 13 is positioned in the drawnout position, the test position, or the drawn-in position within the cradle 11.

Figure 2:
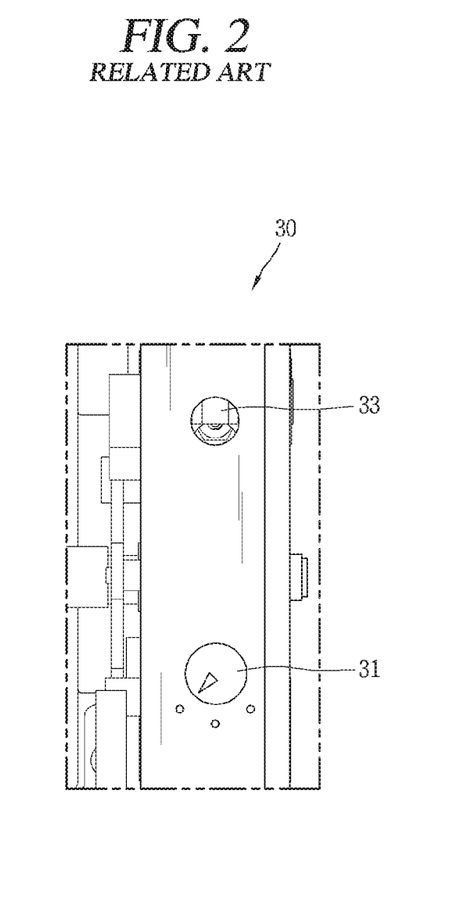
FIG. 2 is a front view illustrating a position indicator provided in another conventional air circuit breaker.

FIG. 2 is a front view illustrating a position indicator provided in a conventional different air circuit breaker.

As illustrated in FIG. 2, the air circuit breaker includes a position indicator 30 and a position of the air circuit breaker is indicated through the position indicator 30.

However, in the position indicator 30 of the conventional air circuit breaker, a handle insertion part 33 is positioned above the indicator 31, and thus, when a position of the circuit breaker body 13 is adjusted using the handle 17, the indicator 31 is covered by the handle 17, making it difficult to accurately check a current position of the circuit breaker body 13.

Also, while the handle 17 is in use, there is no configuration of limiting rotation of the handle 17 when the circuit breaker body 13 is in the drawn-out position, the test position, or the drawn-in position, and thus, it is difficult to accurately position the circuit breaker body 13 in the drawn-out position, the test position, and the drawn-in position.

SUMMARY OF THE DISCLOSURE

Therefore, an aspect of the detailed description is to provide a position indicator of an air circuit breaker capable of enabling an indicator to be positioned above a handle insertion part by converting a rotational motion of a worm wheel into a translational motion in a horizontal direction.

To achieve these and other advantages and in accordance with the purpose of this specification, as embodied and broadly described herein, a position indicator of an air circuit breaker for indicating a position of a circuit breaker body according to movement of the circuit breaker body within a cradle, includes: a handle insertion part to which a handle is inserted; a worm gear rotated according to rotation of the handle inserted in the handle insertion part; a worm wheel rotated in association with the worm gear; a link part connected to the worm wheel in one end and connected to a movement member in the other end and moving the movement member in a horizontal direction according to rotation of the worm wheel; a movement member connected to the other end of the link part and rotating the indicator, while moving in a horizontal direction according to movement of the link part; and an indicator inserted into the movement member in a state of being positioned above the handle insertion part, and indicating a position of the circuit breaker body, while rotating according to movement of the movement member in a horizontal direction.

Also, a button part may be positioned between the indicator and the handle insertion part and move within the cradle to limit rotation of the worm gear or release limitation of the worm gear.

Also, a movement adjustment lever may be positioned between the indicator and the button part and a catch recess may be formed at an upper end of the button part, and when the indicator rotates according to rotation of the handle, the movement adjustment lever may rotate through the indicator so as to be caught in the catch recess or released from the catch recess.

Also, a plurality of pressing protrusions may be formed to be positioned above the movement adjustment lever on an outer circumferential surface of the indicator, and when the indicator rotates, the plurality of pressing protrusions may press one end of the movement adjustment lever to release engagement between the other end of the movement adjustment lever and the catch recess.

Also, a space part may be formed between the pressing protrusions, and when the indicator rotates in a state that the pressing protrusions press the movement adjustment lever, one end of the movement adjustment lever may rotate toward the space part and the other end of the movement adjustment lever may be caught in the catch recess.

A rotation preventing member may be formed to protrude toward the worm wheel on an inner side of the air circuit breaker and a movement recess may be formed at one end of the worm wheel to allow the rotation preventing member to be inserted and positioned in the movement recess, and when the rotation preventing member in a state of being inserted in the movement recess rotates to a drawn-in position or a drawn-out position, the rotation preventing member may contact each end of the movement recess and rotation of the worm wheel may be limited in the drawn-in position or drawn-out position.

Also, an indication part may be formed at a front end of the indicator, and an indication portion indicating a drawn-out position, a test position, or a drawn-in position of the circuit breaker body may be formed near the indication part in the air circuit breaker.

Also, a protrusion may be formed on an inner side of the button part and a recess may be formed on an outer circumferential surface of the worm gear to allow the protrusion to be inserted in the recess, so that the protrusion is inserted into the recess according to movement of the button part to limit rotation of the worm gear.

As described above, in the position indicator of an air circuit breaker according to the present disclosure, since the link part is connected to the worm wheel rotated according to rotation of the worm gear and the movement member is connected to the link part, a rotational motion of the worm wheel is changed to a translational motion in the horizontal direction through the link part and the movement member. Thus, although the indicator is positioned on an upper side of the handle insertion part, a position according to movement of the circuit breaker body may be easily indicated, while using the simple structure.

Also, since the button part is formed below the indicator and protrudes forwards according to rotation of the indicator so as to be coupled to the worm gear, rotation of the handle is temporarily stopped in the drawn-in position, the drawn-out position, or the test position, so that the user may easily execute position adjustment of the circuit breaker body.

Also, since the movement adjustment lever is provided between the indicator and the button part, the plurality of pressing protrusions are formed in the indicator, and the space part is formed between the pressing protrusions, the pressing protrusions press the movement adjustment lever to rotate the movement adjustment lever according to rotation of the indicator in association with rotation of the worm gear, whereby the circuit breaker body limits rotation of the handle is limited in the drawn-out position, the test position, or the drawn-in position.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure. In the drawings.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a position indicator of an air circuit breaker according to an embodiment of the present disclosure will be described in detail with reference to the accompanying drawings.

Figure 3:
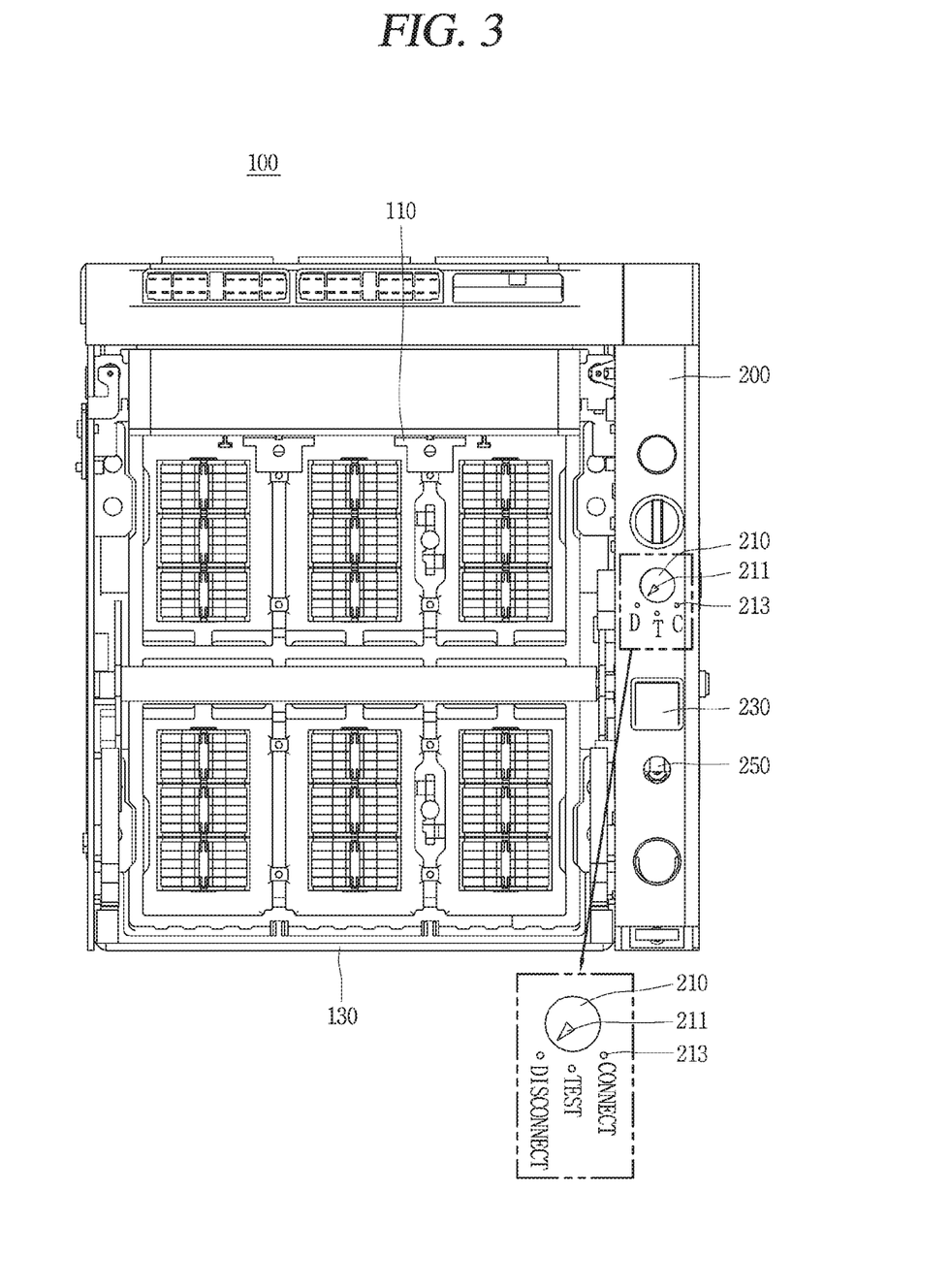
FIG. 3 is a front view illustrating an air circuit breaker having a position indicator according to the present disclosure.
Figure 4:
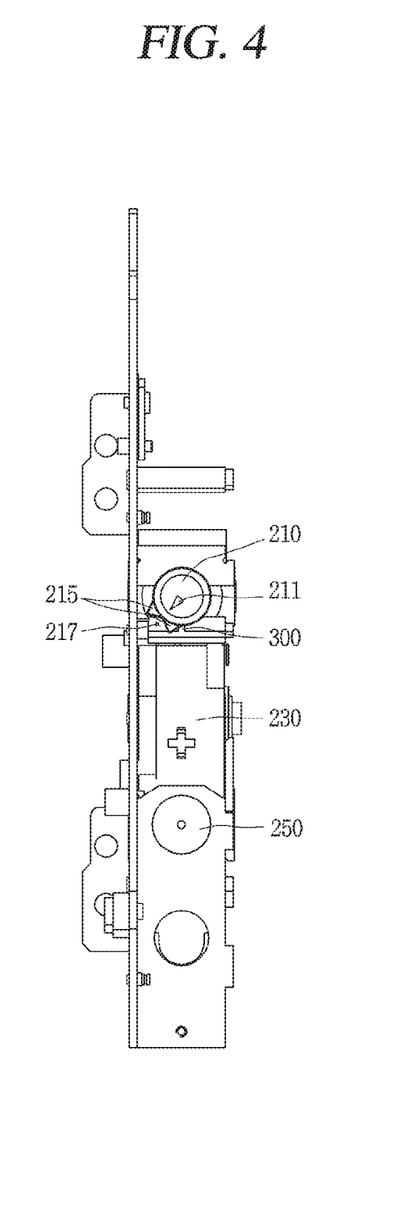
FIG. 4 is a front view illustrating that a position indicator provided in an air circuit breaker is in a drawn-out position according to the present disclosure.
Figure 5:
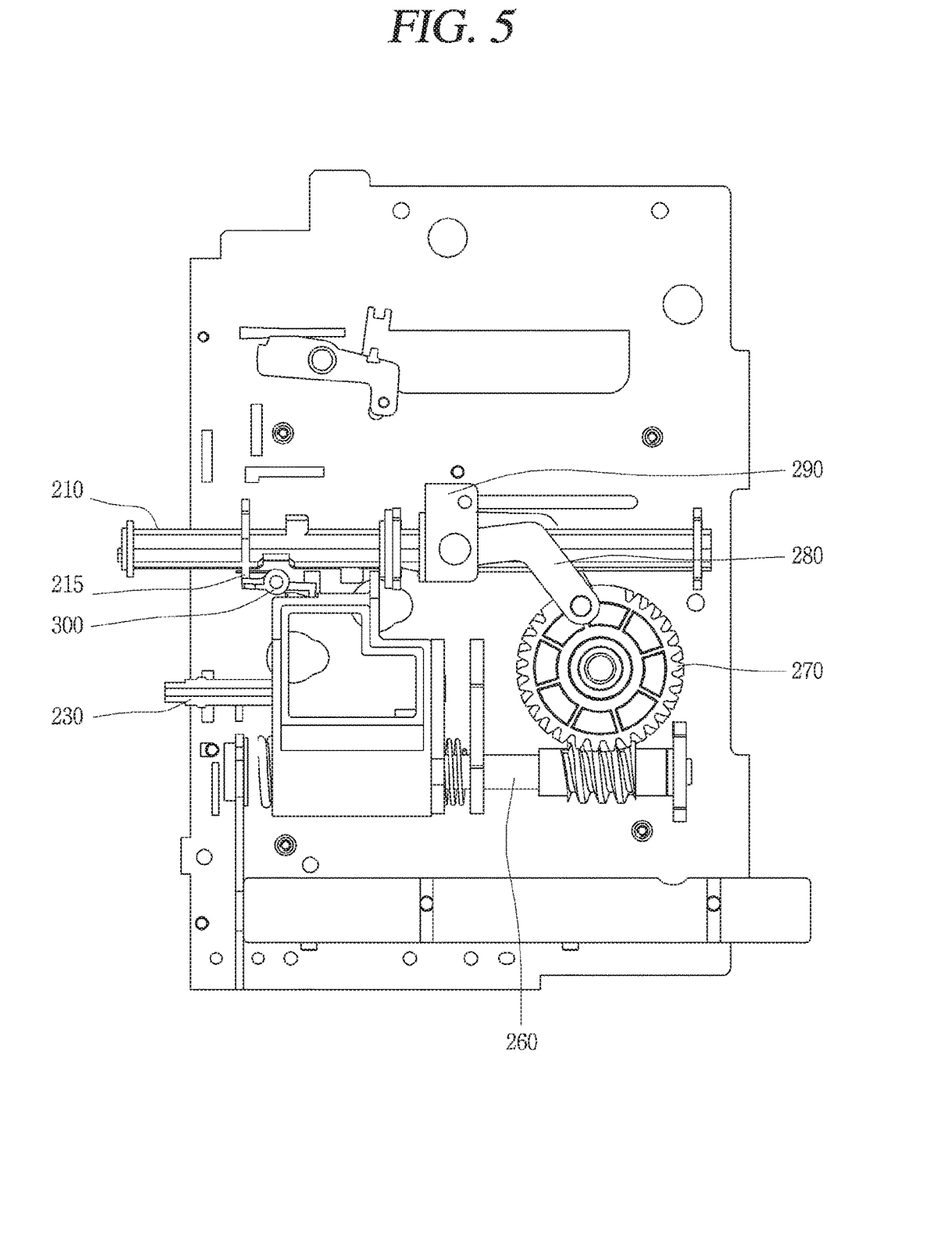
FIG. 5 is a configuration view illustrating that position indicator provided in an air circuit breaker is in a drawn-out position according to the present disclosure.

FIG. 3 is a front view illustrating an air circuit breaker having a position indicator according to the present disclosure, FIG. 4 is a front view illustrating that a position indicator provided in an air circuit breaker is in a drawn-out position according to the present disclosure, and FIG. 5 is a configuration view illustrating that position indicator provided in an air circuit breaker is in a drawn-out position according to the present disclosure.

Figure 6:
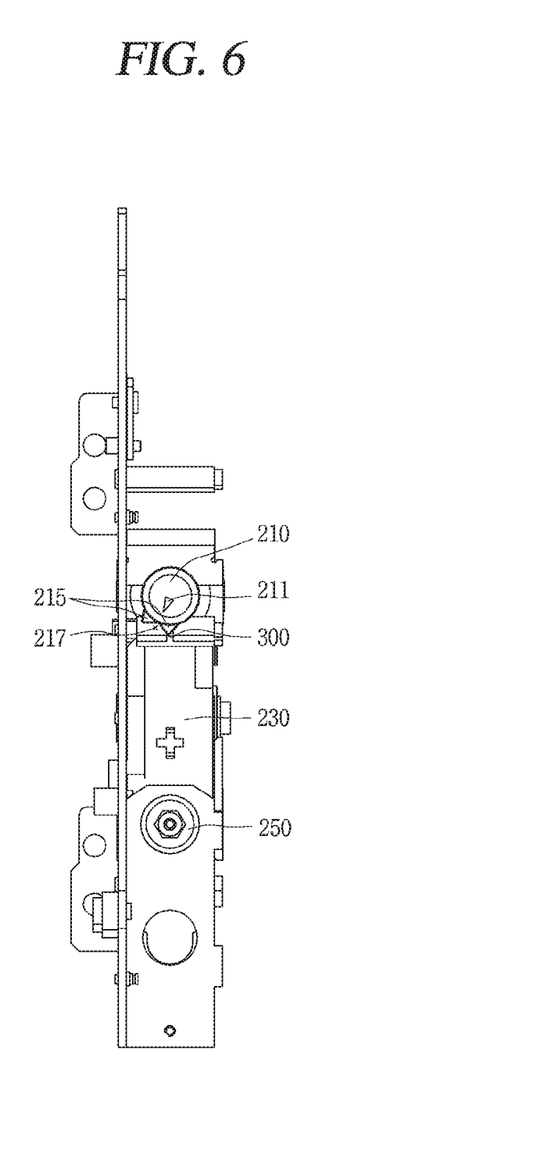
FIG. 6 is a front view illustrating that a position indicator provided in an air circuit breaker moves from a drawn-out position to a test position according to the present disclosure.
Figure 7:
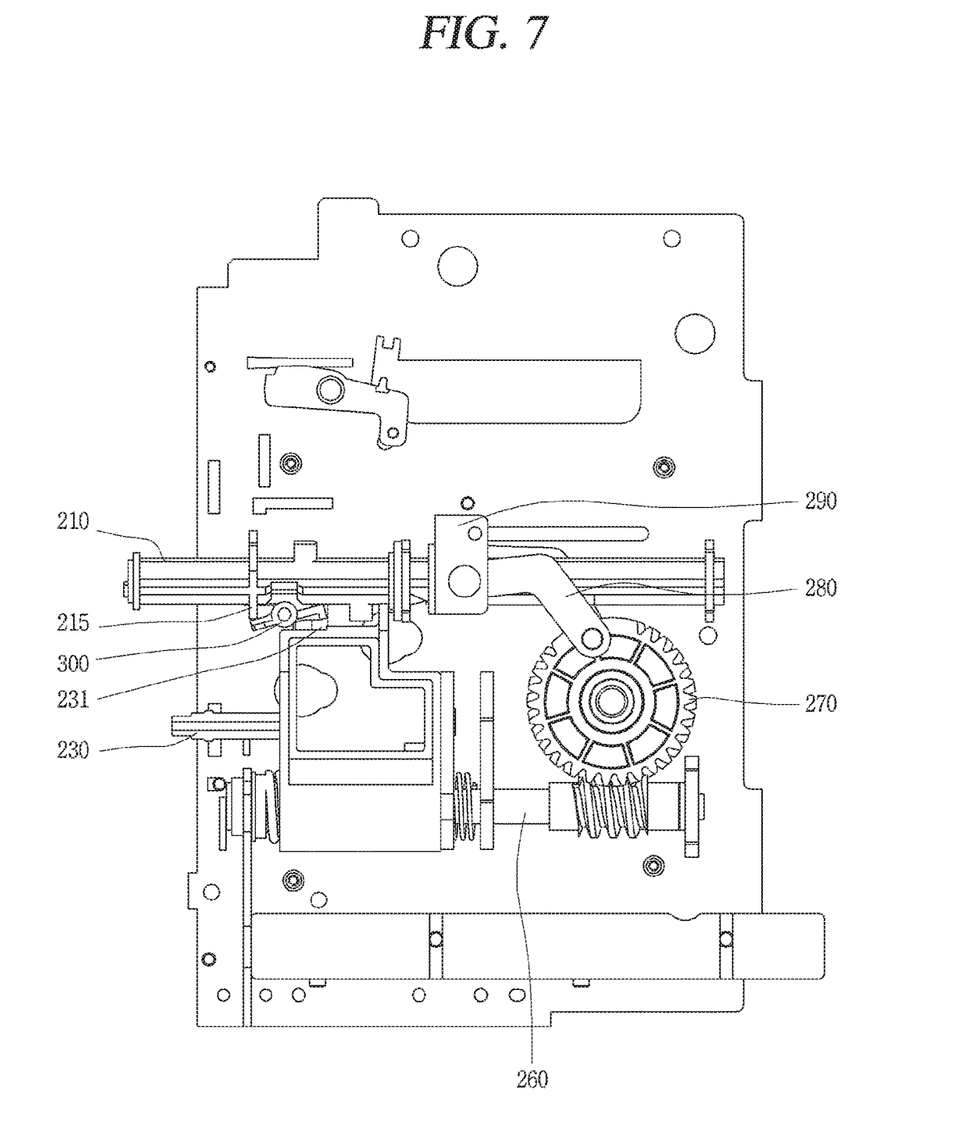
FIG. 7 is a configuration view illustrating that a position indicator provided in an air circuit breaker moves from a drawn-out position to a test position according to the present disclosure.
Figure 8:
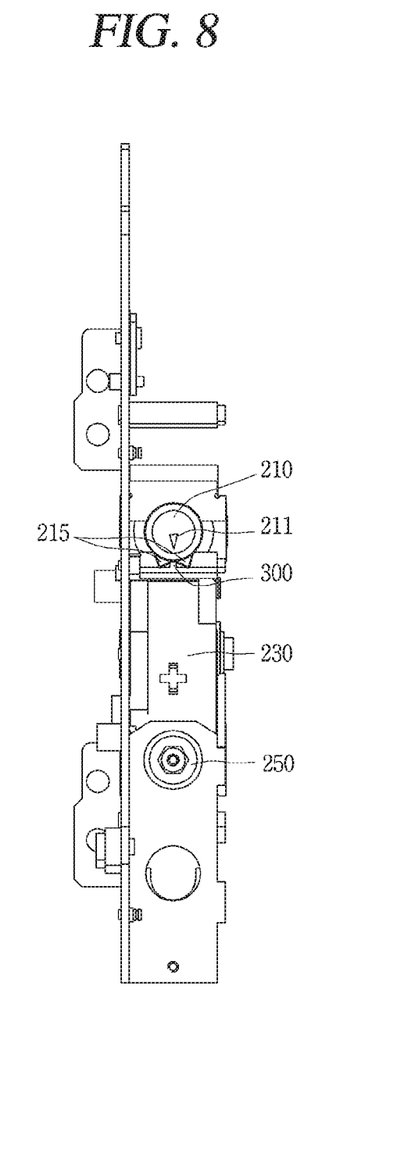
FIG. 8 is a front view illustrating that a position indicator provided in an air circuit breaker is in a test position according to the present disclosure.
Figure 9:
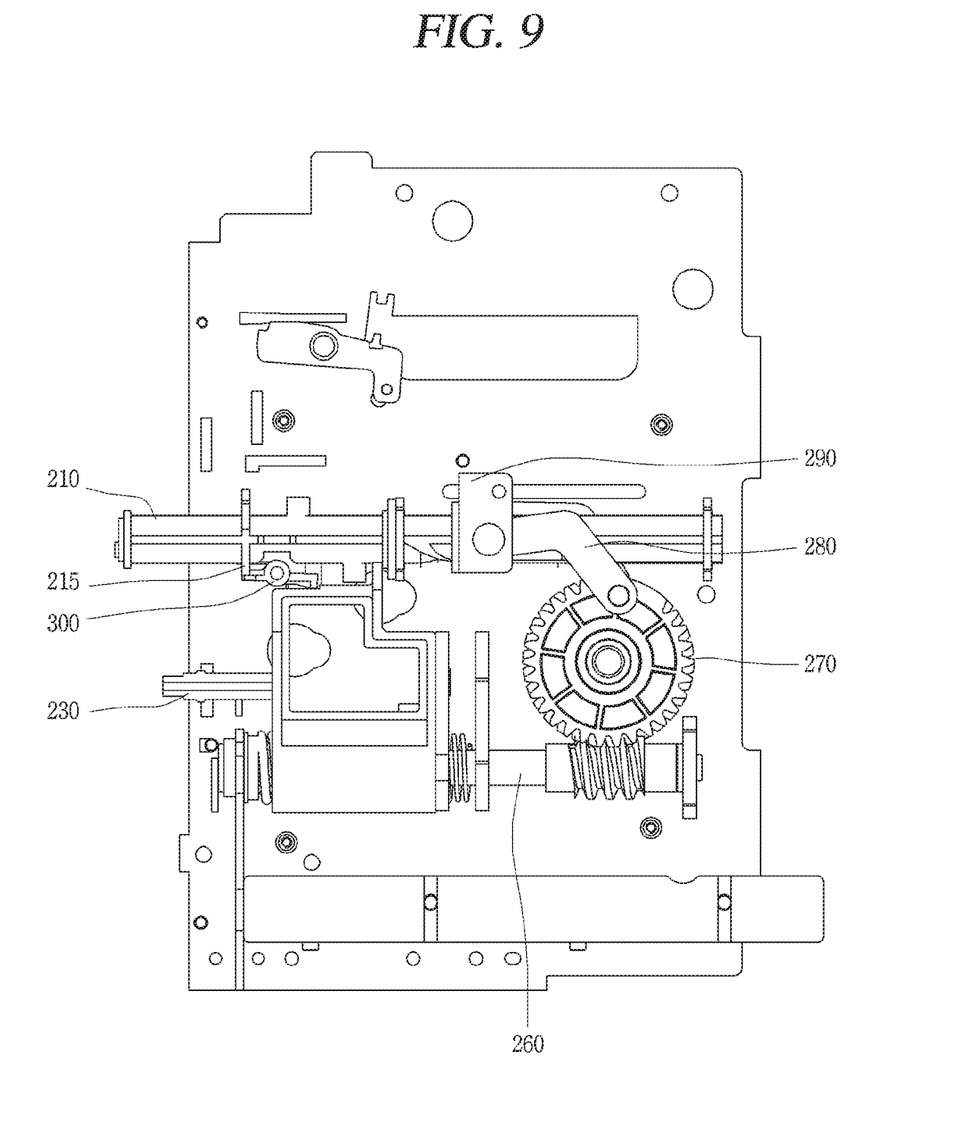
FIG. 9 is a configuration view illustrating that a position indicator provided in an air circuit breaker is in a test position according to the present disclosure.

Also, FIG. 6 is a front view illustrating that a position indicator provided in an air circuit breaker moves from a drawn-out position to a test position according to the present disclosure, FIG. 7 is a configuration view illustrating that a position indicator provided in an air circuit breaker moves from a drawn-out position to a test position according to the present disclosure, FIG. 8 is a front view illustrating that a position indicator provided in an air circuit breaker is in a test position according to the present disclosure, and FIG. 9 is a configuration view illustrating that a position indicator provided in an air circuit breaker is in a test position according to the present disclosure.

Figure 10:
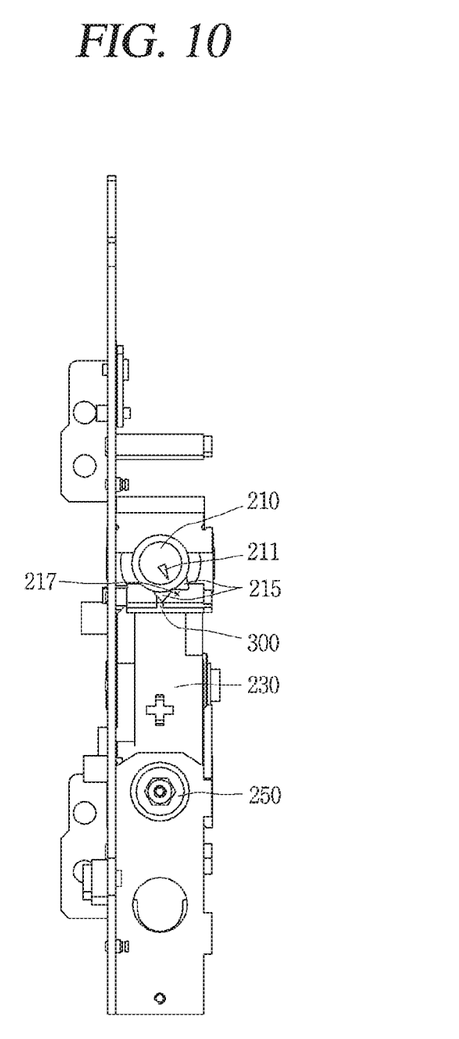
FIG. 10 is a front view illustrating that a position indicator provided in an air circuit breaker is in a drawn-in position according to the present disclosure.
Figure 11:
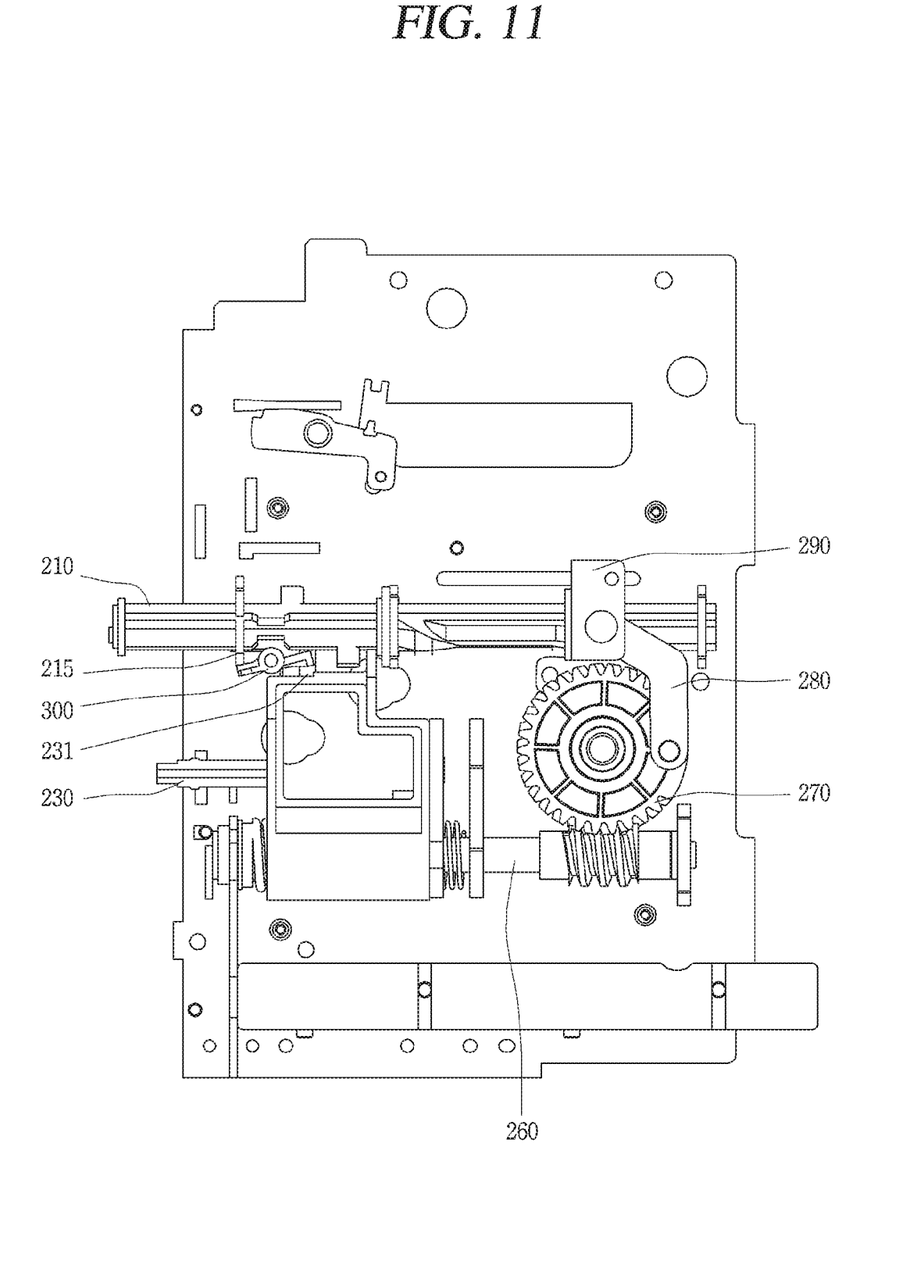
FIG. 11 is a configuration view illustrating that a position indicator provided in an air circuit breaker is in a drawn-in position according to the present disclosure.
Figure 12:
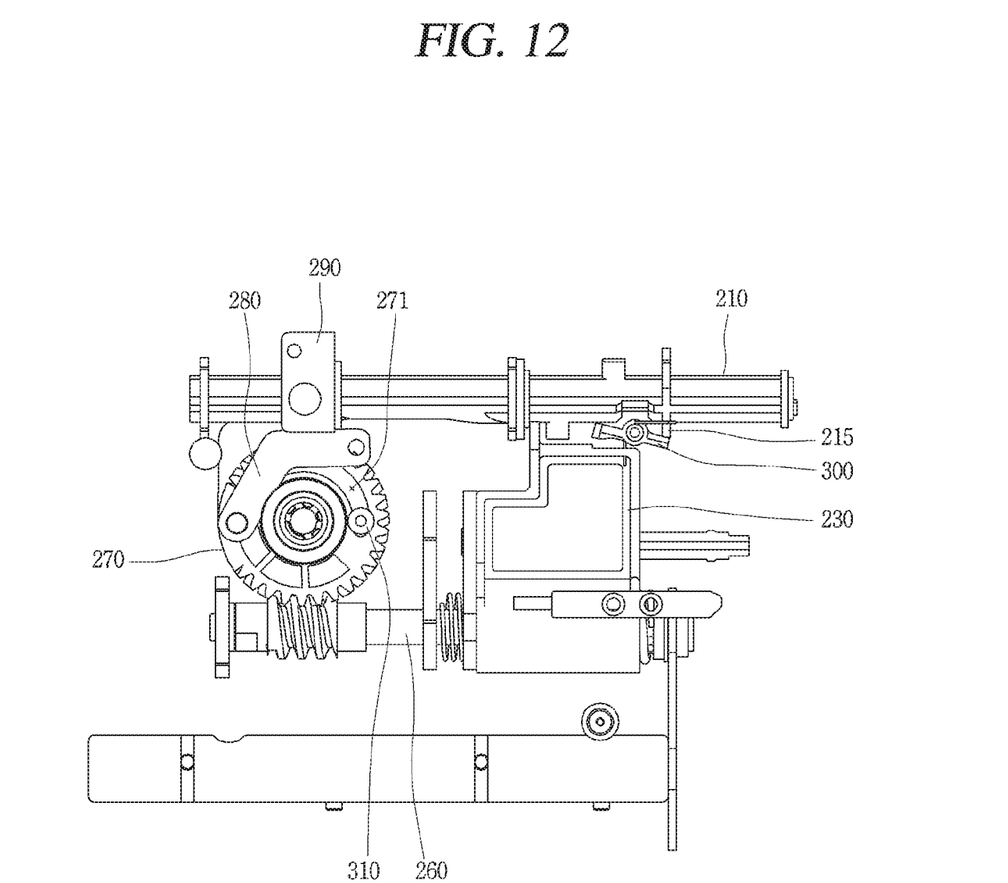
FIG. 12 is a configuration view illustrating a state in which a rotation preventing member is inserted in a worm wheel configured in a position indicator of an air circuit breaker according to the present disclosure.
Figure 13:
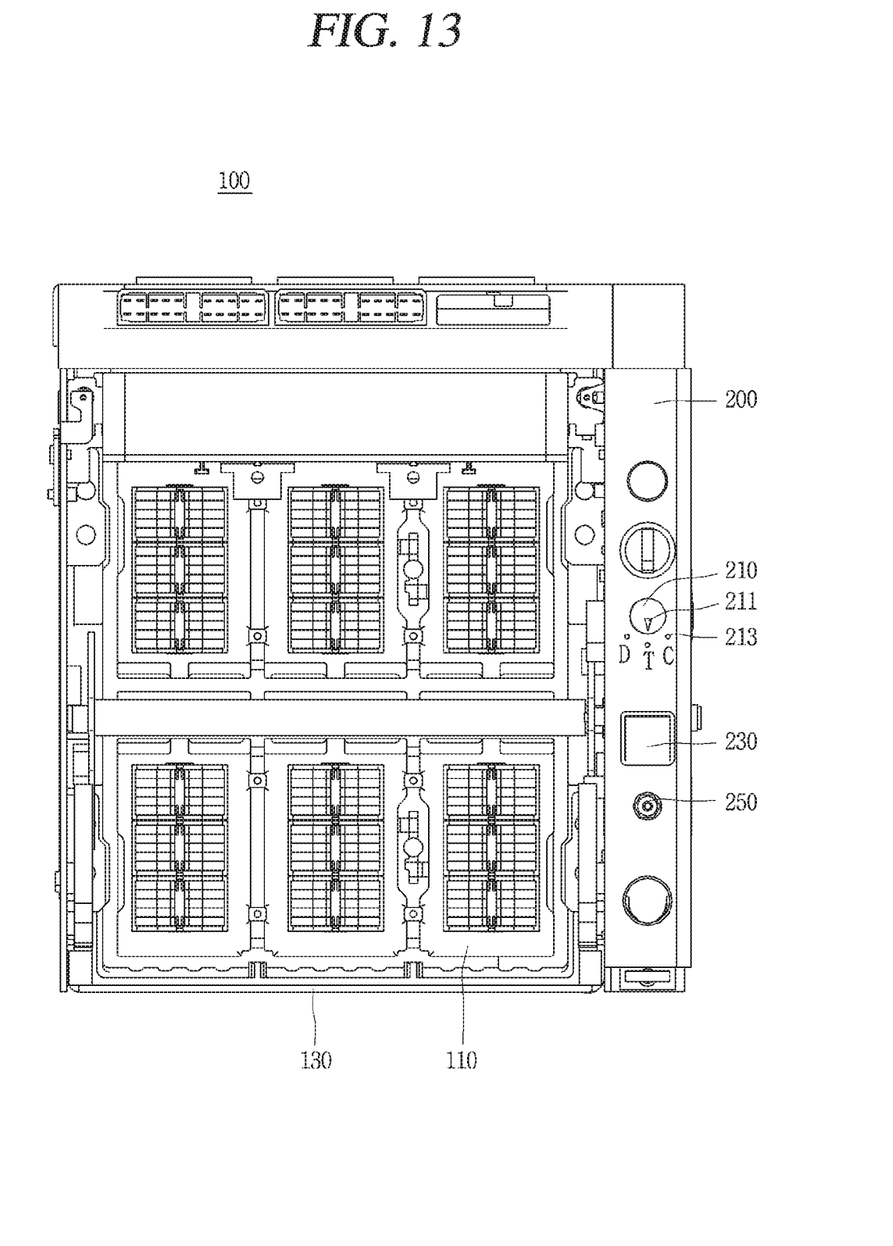
FIG. 13 is a front view illustrating that a position indicator of an air circuit breaker indicates a test position to the outside according to the present disclosure.

Also, FIG. 10 is a front view illustrating that a position indicator provided in an air circuit breaker is in a drawn-in position according to the present disclosure, FIG. 11 is a configuration view illustrating that a position indicator provided in an air circuit breaker is in a drawn-in position according to the present disclosure, FIG. 12 is a configuration view illustrating a state in which a rotation preventing member is inserted in a worm wheel configured in a position indicator of an air circuit breaker according to the present disclosure, and FIG. 13 is a front view illustrating that a position indicator of an air circuit breaker indicates a test position to the outside according to the present disclosure.

As illustrated in FIG. 3, in a state that a circuit breaker body 110 is positioned within a cradle 130, an air circuit breaker 100 having a position indicator 200 moves to a drawn-out position (DISCONNECTED POSITION), a test position (TEST POSITION), and a drawn-in position (CONNECTED POSITION) so as to be coupled to a terminal (not shown) provided in the cradle to connect a power supply side and a load side.

Here, the air circuit breaker 100 has a position indicator 200 externally indicating a position of the circuit breaker body 110 moving within the cradle 130.

As illustrated in FIGS. 4 and 5, the position indicator 200 provided in the air circuit breaker 100 according to the present disclosure includes a handle insertion part 250, a worm gear 260, a worm wheel 270, a link part 280, a movement member 290, and an indicator 210.

The handle insertion part 250 is connected to the worm gear 260, and a handle (not shown) is inserted into the handle insertion part 250. When the handle is inserted and rotated in the handle insertion part 250, the worm gear 260 is rotated according to rotation of the handle.

The worm gear 260 is connected to the handle insertion part 250, and when the handle is inserted, the handle is inserted into the worm gear 260 and the worm gear 260 rotates in association with the handle.

The worm wheel 270 is positioned to be engaged with the worm gear 260, and when the worm gear 260 rotates, the worm wheel 270 rotates in association with the worm gear 260.

On end of the link part 280 is connected to the worm wheel 270 and the other end of the link part 280 is connected to the movement member 290. When the worm wheel 270 rotates, the link part 280 moves according to rotation of the worm wheel 270 to change a rotational motion of the worm wheel 270 into a translation motion to move the movement member 290 in a horizontal direction to rotate the indicator 210.

The movement member 290 is connected to the other end of the link part 280, and in a state that the indicator 120 is inserted to penetrate through the movement member 290, the movement member 290 rotates the indicator 210, while moving in a horizontal direction according to movement of the link part 280.

In a state that the indicator 210 is positioned above the handle insertion part 250, the indicator 210 is inserted into the movement member 290 and externally indicates a drawn-in position, a test position, and a drawn-out position of the circuit breaker body 110, while rotating according to a horizontal movement of the movement member 110.

A button part 230 moving within the cradle and limiting rotation of the worm gear 260 or releasing the limitation of the worm gear 260 may further be provided between the indicator 210 and the handle insertion part 250.

The button part 230 may be pressed within the position locator 200 according to a user operation so as to be caught by a movement adjustment lever 300 (to be described) according to rotation of the indicator 210 or released from the movement adjustment lever 300 to adjust rotation of the worm gear 260.

In detail, the movement adjustment lever 300 is positioned between the indicator 210 and the button part 230, and a catch recess 231 is formed at an upper end of the button part 230.

Also, a plurality of pressing protrusions 215 are formed and positioned above the movement adjustment lever 300 on an outer circumferential surface of the indicator 210.

Thus, when the indicator 210 rotates, the pressing protrusions 215 press one end of the movement adjustment lever 300 to release the other end of the movement adjustment lever 300 from the catch recess 231.

Also, a space part 217 is formed between the pressing protrusions 215. In a state that the pressing protrusion 215 presses the movement adjustment lever 300, when the indicator 210 rotates according to rotation of the worm gear 260, the pressing protrusion 215 moves according to rotation of the indicator 210, one end of the movement adjustment lever 300 rotates toward the space part 217, and the other end of the movement adjustment lever 300 is caught in the catch recess 231.

As illustrated in FIG. 12, a rotation preventing member 310 may be formed to protrude toward the worm wheel 270 on an inner side of the air circuit breaker 100.

Also, a movement recess 271 may be formed to allow the rotation preventing member 310 to be inserted and position may be formed at one end of the worm wheel 270.

Thus, in a state that the rotation preventing member 310 is inserted into the movement recess 271, when the worm wheel 270 rotates to the drawn-in position or drawn-out position, the rotation preventing member 310 contacts each end of the movement recess 271, thereby limiting rotation of the worm wheel 270 in the drawn-in or drawn-out position.

Also, as illustrated in FIG. 13, an indication part 211 formed as an arrow, or the like, is formed at a front end of the indicator 210, and an indication portion 213 indicating a drawn-out position, a test position, or a drawn-in position of the circuit breaker body 110 may be formed near the indication part 211 in the air circuit breaker 100.

Thus, when the indicator 210 rotates, a position of the indication part 211 is changed and a position of the circuit breaker body 110 is externally indicated through the indication portion 213.

Hereinafter an operational process of the position indicator of the air circuit breaker according to the present disclosure will be described in detail with reference to the accompanying drawings.

First, as illustrated in FIGS. 4 and 5, when the circuit breaker body of the air circuit breaker 100 is in the drawn-out position within the cradle 130, the indication part 211 formed as an arrow, or the like, of the indicator 210 indicates the drawn-out position of the indication portion 213.

Here, the pressing protrusion 215 is positioned in a state of being tightly attached to an end of the movement adjustment lever 300, and the movement adjustment lever 300 is caught in the catch recess 231 of the button part 230, so that the button part 230 does not protrude. When the button part 230 does not protrude, the handle inserted in the handle insertion part 250 is rotatable.

Here, as illustrated in FIGS. 6 and 7, when a user inserts the handle into the handle insertion part 250 and rotates the handle, the worm gear 260 is rotated and the worm wheel 270 engaged with the worm gear 260 rotates in association therewith, and at the same time, the link part 280 enables the movement member 290 to make a translational motion in a horizontal direction.

When the movement member 290 makes the translational motion in the horizontal direction, the indicator 210 inserted into the movement member 290 rotates and the pressing protrusion 215 formed in the indicator 210 continuously rotates to press one end of the movement adjustment lever 300 downwards.

When one end of the movement adjustment lever 300 is pressed downwards, the other end is disengaged from the catch recess 231 and the button part 230 protrudes forwards through a spring 400, and a protrusion (not shown) formed in the button part 230 is inserted into a recess (not shown) formed in the worm gear 260 to limit rotation of the worm gear 260.

Here, as illustrated in FIGS. 8 and 9, when the handle continuously rotates in a direction of the test position in a state that the button part 230 is pressed, the indicator 210 continuously rotates, and accordingly, the pressing protrusion 215 moves again in a counterclockwise direction and the movement adjustment lever 300 rotates toward the space part 217 positioned between the pressing protrusions 215

When the movement adjustment lever 300 rotates toward the space part 217, the other end of the movement adjustment lever 300 is caught in the catch recess 231 of the button part 230 so that the button part 230 cannot protrude forwards and the handle can be continuously rotated and the circuit breaker body 110 is positioned in the test position.

After that, as illustrated in FIGS. 10 and 11, when the user rotates the circuit breaker body 110 to the drawn-in position, the indicator 210 rotates, the pressing protrusion 215 positioned to be adjacent to the space part 217 presses the movement adjustment lever 300 downwards again to disengage the movement adjustment lever 300 from the catch recess 231, and as the button part 230 protrudes forwards through the spring 400, a protrusion is inserted into a recess to limit rotation of the worm gear 260.

Through the process described above, the circuit breaker body 110 moves to the drawn-out position, the test position, and drawn-in position through rotation of the handle, and rotation of the handle is selectively limited through the button part 230 so that a position of the circuit breaker body 110 is more accurately indicated to the outside or to the user recognition.

In the present disclosure configured and operated as described above, since the link part 280 is connected to the worm wheel 270 rotated according to rotation of the worm gear 260 and the movement member 290 is connected to the link part 280, a rotational motion of the worm wheel 270 is changed to a translational motion in the horizontal direction through the link part 280 and the movement member 290. Thus, although the indicator 210 is positioned on an upper side of the handle insertion part 250, a position according to movement of the circuit breaker body 110 may be easily indicated, while using the simple structure.

Also, since the button part 230 is formed below the indicator 210 and protrudes forwards according to rotation of the indicator 210 so as to be coupled to the worm gear 260, rotation of the handle is temporarily stopped in the drawn-in position, the drawn-out position, or the test position, so that the user may easily execute position adjustment of the circuit breaker body 110.

Also, since the movement adjustment lever 300 is provided between the indicator 210 and the button part 230, the plurality of pressing protrusions 215 are formed in the indicator 210, and the space part 217 is formed between the pressing protrusions 215, the pressing protrusions 215 press the movement adjustment lever 300 to rotate the movement adjustment lever 300 according to rotation of the indicator 210 in association with rotation of the worm gear 260, whereby the circuit breaker body 110 limits rotation of the handle is limited in the drawn-out position, the test position, or the drawn-in position.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A position indicator of an air circuit breaker for indicating a position of a circuit breaker body according to movement of the circuit breaker body within a cradle, the position indicator comprising:
   a handle insertion part to which a handle is inserted;
   a worm gear rotated according to rotation of the handle inserted in the handle insertion part;
   a worm wheel rotated in association with the worm gear;
   a link part connected to the worm wheel in one end and connected to a movement member in the other end and moving a movement member in a horizontal direction according to rotation of the worm wheel; and
   an indicator inserted into the movement member in a state of being positioned above the handle insertion part, and indicating a position of the circuit breaker body, while rotating according to movement of the movement member in the horizontal direction.

2. The position indicator of claim 1, wherein a button part is positioned between the indicator and the handle insertion part and moves within the cradle to limit rotation of the worm gear or release limitation of the worm gear.

3. The position indicator of claim 2, wherein a movement adjustment lever is positioned between the indicator and the button part,
   wherein a catch recess is formed at an upper end of the button part, and
   wherein when the indicator rotates according to rotation of the handle, the movement adjustment lever rotates through the indicator so as to be caught in the catch recess or released from the catch recess.

4. The position indicator of claim 3, wherein
   a plurality of pressing protrusions are formed to be positioned above the movement adjustment lever on an outer circumferential surface of the indicator, and
   when the indicator rotates, the plurality of pressing protrusions press one end of the movement adjustment lever to release engagement between the other end of the movement adjustment lever and the catch recess.

5. The position indicator of claim 4, wherein
a space part is formed between the pressing protrusions, and
when the indicator rotates in a state that the pressing protrusions press the movement adjustment lever, one end of the movement adjustment lever rotates toward the space part and the other end of the movement adjustment lever is caught in the catch recess.

6. The position indicator of claim 1, wherein
a rotation preventing member is formed to protrude toward the worm wheel on an inner side of the air circuit breaker, and
a movement recess is formed at one end of the worm wheel to allow the rotation preventing member to be inserted and positioned in the movement recess, and
when the rotation preventing member in a state of being inserted in the movement recess rotates to a drawn-in position or a drawn-out position, the rotation preventing member contacts each end of the movement recess and rotation of the worm wheel is limited in the drawn-in position or drawn-out position.

7. The position indicator of claim 1, wherein
an indication part is formed at a front end of the indicator, and
an indication portion indicating a drawn-out position, a test position, or a drawn-in position of the circuit breaker body is formed near the indication part in the air circuit breaker.

8. The position indicator of claim 2, wherein
a protrusion is formed on an inner side of the button part and
a recess is formed on an outer circumferential surface of the worm gear to allow the protrusion to be inserted in the recess, so that the protrusion is inserted into the recess according to movement of the button part to limit rotation of the worm gear.

* * * * *